C. C. McCOLGAN & J. M. SMITH.
SIGNALING DEVICE FOR VEHICLES.
APPLICATION FILED DEC. 14, 1914.

1,162,724.

Patented Nov. 30, 1915.
3 SHEETS—SHEET 1.

Witnesses
Porter H. Flautt,
Bertha K. Walter.

Inventors
Charles C. McColgan
John Maulsby Smith
By Mann & Co.
Attorneys.

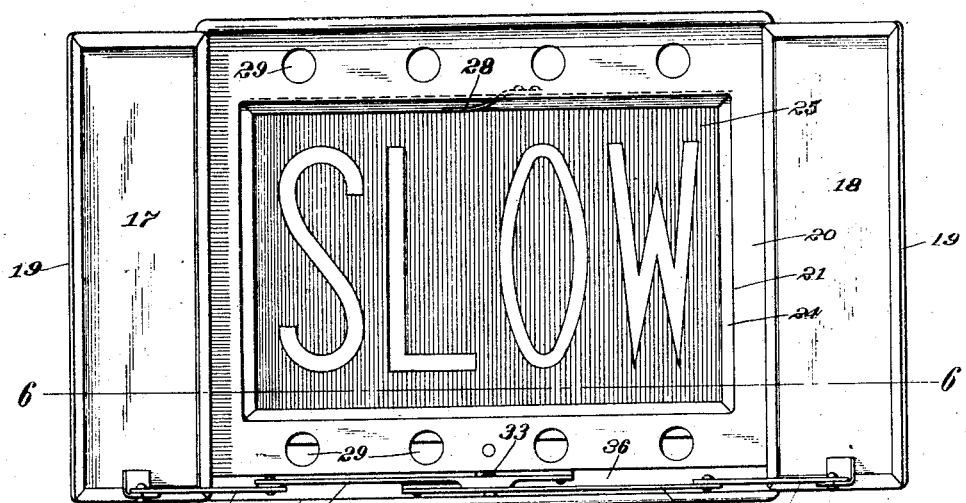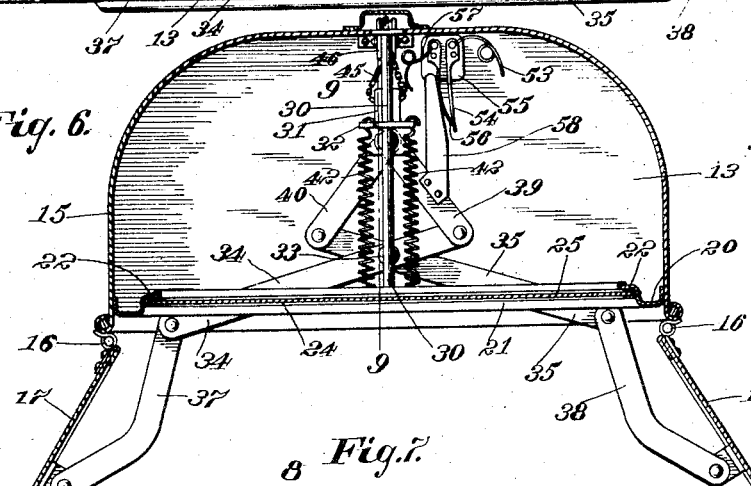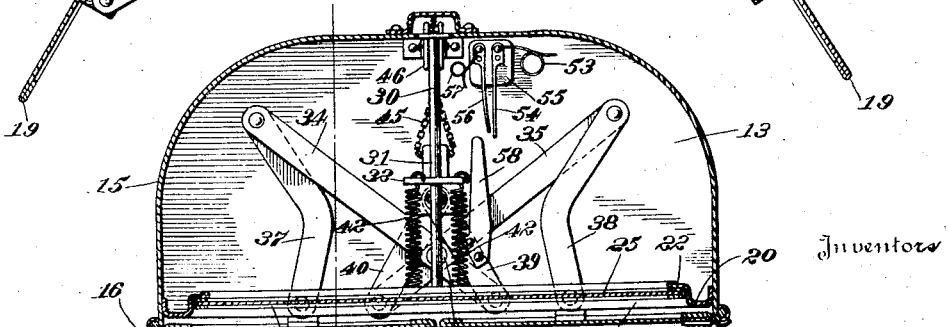

C. C. McCOLGAN & J. M. SMITH.
SIGNALING DEVICE FOR VEHICLES.
APPLICATION FILED DEC. 14, 1914.
1,162,724.
Patented Nov. 30, 1915.
3 SHEETS—SHEET 3.
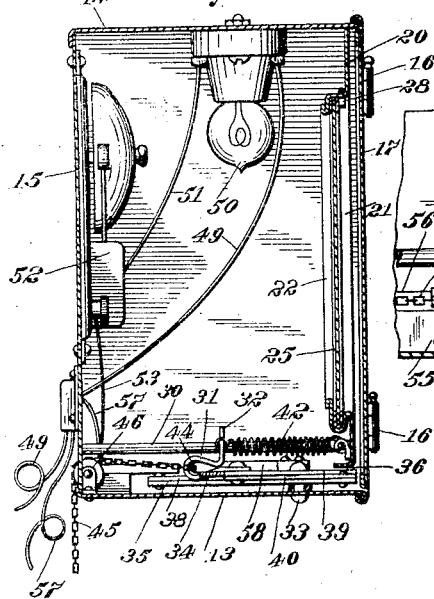
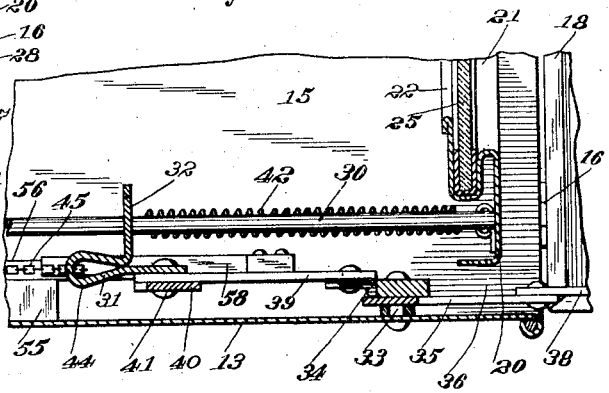
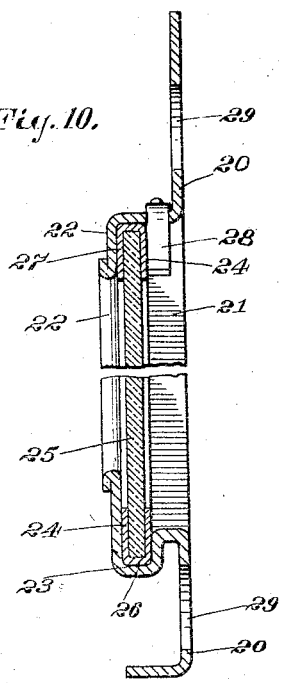
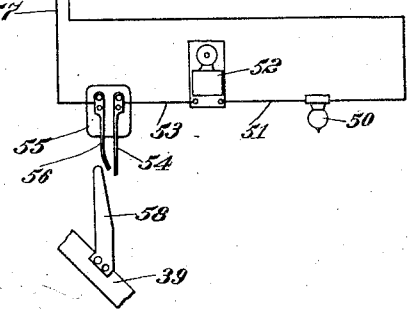
Witnesses
Porter H. Flautt
Bertha K. Walter
Inventors
Charles C. McColgan
John Maulsby Smith
By Mann & Co.
Attorneys.

UNITED STATES PATENT OFFICE.

CHARLES C. McCOLGAN AND JOHN MAULSBY SMITH, OF BALTIMORE, MARYLAND; SAID SMITH ASSIGNOR TO SAID McCOLGAN.

SIGNALING DEVICE FOR VEHICLES.

1,162,724.   Specification of Letters Patent.   Patented Nov. 30, 1915.

Application filed December 14, 1914. Serial No. 877,009.

*To all whom it may concern:*

Be it known that we, CHARLES C. McCOLGAN and JOHN MAULSBY SMITH, citizens of the United States, residing at Baltimore, in the State of Maryland, have invented certain new and useful Improvements in Signaling Devices for Vehicles, of which the following is a specification.

This invention relates to an improved signal device for vehicles and has particular reference to a signal for use on automobiles to warn drivers or operators of vehicles at the rear of an intended change in the movement of the vehicle in front.

One object of the invention is to provide an improved construction of signal mechanism whereby the signal, when actuated will be of a character that will arrest the attention of persons at the rear and give warning of an intended change in the movement of the car; will also sound an audible alarm and effect an illumination of the warning sign.

Another object is to provide a simple and comparatively inexpensive mechanism for carrying out the idea involved.

With these and other objects in view the invention is illustrated in the accompanying drawings, wherein,—

Figure 1:
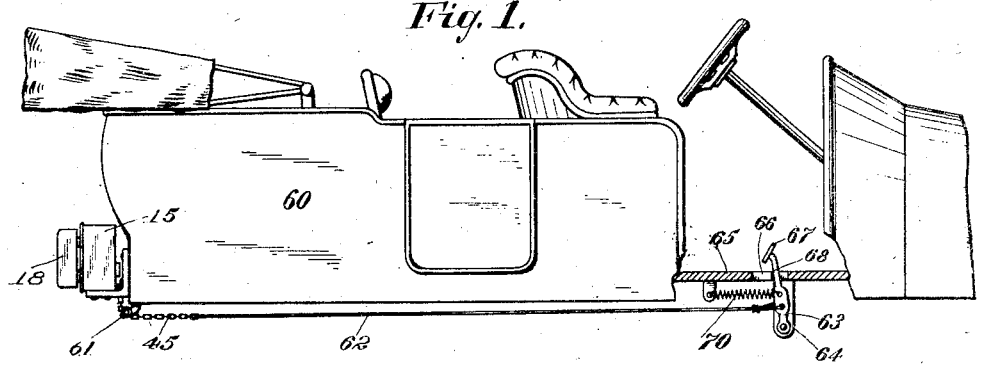
Figure 2:
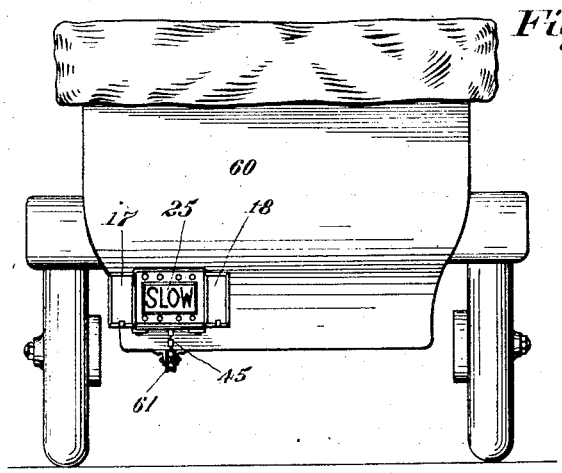
Figure 3:
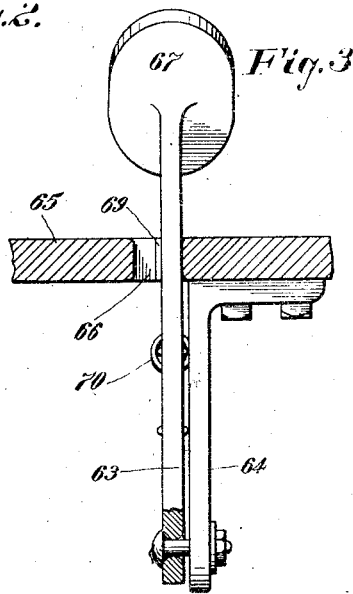
Figure 4:
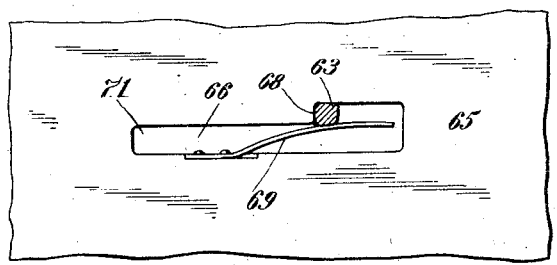

Figure 1, shows a vehicle body, such as an automobile, to which the improved device is attached. Fig. 2, illustrates a rear elevation of the same. Fig. 3, shows an enlarged vertical sectional detail through the floor of the body to show the slot therein and the foot lever for operating the signal. Fig. 4, illustrates in top plan, a portion of the floor and the slot therein and also shows the means for locking the lever, which latter is shown in cross-section, in the operated position. Fig. 5, shows the signal device in the operated position as viewed in the rear elevation. Fig. 6, illustrates a sectional plan view of the same,—the section being taken on the line 6—6 of Fig. 5. Fig. 7, shows the same parts in sectional plan; the parts however being in the normal inoperated position. Fig. 8, illustrates a vertical cross-sectional view through the signal box,—the parts being in the normal inoperated position, as same would appear when viewed on a line 8—8 of Fig. 7. Fig. 9, shows an enlarged vertical sectional detail through a portion of the bottom and the lower portion of the signal bearing wall as viewed on the line 9—9 of Fig. 6. Fig. 10, illustrates an enlarged sectional detail through a wall of the box and through the frame that holds the sign plate, and Fig. 11, is a view diagrammatically showing the circuit through the signal bell and lamp.

Referring to the drawings, and particularly Figs. 5 to 9 inclusive, it will be noted that the signal device includes a box or receptacle having a horizontal bottom 13, a top 14, and in the present instance, a vertical wall 15, extending from the bottom to the top and curving from front to rear, whereby to form both the side and rear walls. At the front, the two vertical end edges of the wall 15, are provided with hinges 16, and doors 17 and 18, respectively are hung from said hinges. These doors are hung so that their free vertical edges 19, will confront each other when said doors are shut, as shown in Fig. 7, and the inner surfaces of the doors may be painted a color such as red, that will attract attention when the doors are open. A vertical partition wall 20, is provided in the box or receptacle just inside of the doors, when the latter are closed, and this partition has a central rectangular opening 21, with an inwardly-extending flange 22, around three sides of said opening. At the bottom of the opening, this partition wall preferably has a horizontal channel 23, so that a rectangular frame 24, containing a glass plate 25, may have its lower horizontal edge 26, seated in said channel 23, and its upper horizontal rear face 27, seated against the flange 22, at the upper side of the rectangular opening, as clearly shown in Fig. 10, of the drawing. In practice the glass plate 25, contains a sign which latter may be varied, but which in the present instance comprises the word "Slow". The plate is preferably red in color while the lettering is such as to allow light to show through as will presently be explained. In order that the glass plate 25, and the frame 24, to which it is attached, may be readily removed, we have provided a spring finger 28, on the flange of wall opening 22, which projects down in front of the frame 24, and holds the latter in place. Perforations 29, are provided in the partition wall 20, for a purpose presently to be described.

In carrying out our invention we provide for normally keeping the doors 17 and 18, closed, so as to cover the sign plate, and, when it is desired to warn persons in the rear, to open the doors and thereby expose the warning sign. The means employed to effect these operations will now be explained, reference being made to Figs. 5 to 9, inclusive. A stationary guide rod 30, is sustained in a horizontal position between the partition wall 20, and the rear portion of curved vertical wall 15, and a bracket plate 31, has a vertical portion 32, with a perforation therethrough so that rod 30, may extend freely through said vertical portion and be guided in a horizontal direction between the front and back of the box. Between the bracket plate 31, and the partition wall is a pivot pin 33, which extends vertically from the bottom 13, of the box and two crossed levers 34 and 35, are pivotally connected to said pin 33, so that the outer ends of said levers may project through a slot 36, at the lower edge of the partition wall 20; a washer encircles the pin 33, and has position between the bottom 13, and the lower side of lever 35. The outer free ends of levers 34 and 35, are pivotally connected to the inner ends of links 37 and 38 respectively, and the outer end of link 37, is pivotally connected to door 17, while the outer end of link 38, is pivotally connected to door 18. The inner end of lever 34, is pivoted to an outer end of a link bar 39, while the inner end of lever 35, is pivotally connected to an outer end of a link bar 40. The inner ends of both link bars 39 and 40 are pivoted at 41, to the bracket plate 31, so that a horizontal movement of the bracket plate on the guide rod 30, may cause a movement of the link bars 39 and 40, as will presently be more clearly explained. Horizontal coiled springs 42, at opposite sides of the guide rod 30, have their inner ends connected to the vertical portion 32, of the bracket plate and their outer ends secured at the inner side of the partition wall 20. These springs are normally under tension so as to keep the bracket plate 31, drawn toward the wall 20, on the guide rod 30, as shown in Fig. 7, and thus push the outer ends of link bars 39 and 40 also toward said partition wall. This outward position of the link bars 39 and 40 causes the ends of levers 34 and 35, that are connected to links 37 and 38, to assume a position in the box, and by such position draw on links 37 and 38, and hold doors 17 and 18, closed. It will thus be understood that springs 42, are under sufficient tension to hold the levers and links in position to keep the doors 17 and 18 closed and that to open the doors the bracket plate must be moved on the guide rod 30, in a direction away from the partition wall 20, which movement will further stretch those springs. The means for accomplishing this operation of opening the doors will therefore now be explained.

An eye 44 is formed in the bracket plate 31, as clearly shown in Figs. 8 and 9, so that a chain or other flexible connection 45, may be readily attached thereto. Below the inner end of the guide rod 30, we provide a guide pulley 46, which projects slightly through a slot in the wall 15, and the chain 45, passes over said pulley and extends downwardly from the bottom of the signal box. Obviously by drawing on this chain 15, the bracket plate 31, will be moved along guide rod 30, in a direction away from the partition wall 20, and toward wall 15, so that the link bars 39 and 40, may be moved in a direction that will cause levers 34 and 35, to move links 37 and 38 outwardly and away from the partition wall. This outward movement of said links throws the two doors open and exposes their inner painted surfaces and also uncovers the sign and exposes the latter to the view of vehicle drivers in the rear. The means for operating the chain 45, will presently be explained in connection with Figs. 1 to 4 inclusive in the drawings.

We have further provided an improved means for sounding an alarm, and completing a circuit through a lamp, simultaneously with the opening of the doors 17 and 18, as will now be explained in connection with Figs. 7, 8 and 11 of the drawings to which reference will now be made. At some convenient place on the vehicle we provide a current supply or a battery 48, (shown in Fig. 11) and from one side of the battery we provide a wire or conductor 49, that in the present instance connects with the lamp 50. Another conductor or wire 51, connects the lamp with one post of a bell 52, while a conductor 53, forms a connection between the other post of the bell and a contact plate 54, in the signal box. On the bottom 13, of the box, we provide a block 55, of insulating material, and on top of this block are two contact plates, of which the plate 54, above referred to is one. The other contact plate 56, on said block is connected by a conductor 57, to the other side of the current supply or battery 48. The two contact plates 54 and 56 are therefore insulated from the box by means of the block 55, and the ends of said plates extend horizontally but normally spaced apart, and are capable of yielding so that plate 56, may be pressed toward and into contacting engagement with the plate 54. It will therefore be seen that normally, the plates 54 and 56 are out of engagement, as shown in Figs. 7 and 11, and when in such position, the circuit from battery 48, through the lamp and bell will be broken, but when said plates are brought into contact said circuit will be completed, and the lamp will be lighted and the bell rung. The closing of this circuit is effected by devices that are operated simultaneously with the opening of the doors and the circuit is broken simultaneously with the closing of the doors as will now be explained. As hereinbefore explained, the link bar 39, makes a movement in a direction away from the partition wall 20, during the operation of opening the doors and we have therefore, in the present instance made use of this movement, to effect the completion of the bell and lamp circuit, by providing a switch-arm 58, which is shown as attached to said link bar. This switch-arm extends horizontally from the link bar, and projects toward the ends of the contact plates 54 and 56, so that when said arm makes a movement in a direction to effect an opening of the doors, its free end will engage the contact plate 56, and press it laterally into contacting engagement with plate 54, and thereby close the circuit from the battery through the bell and lamp. Obviously upon a reverse movement of the link bar, which takes place to close the doors, the switch arm 58, will be drawn away from the contact plate 56, and allow the latter to move away from engagement with plate 54, thereby opening the circuit and cutting out the operation of the lamp and bell as the doors close.

In the application of the signal device to an automobile, or other vehicle, the attachment may be made at any convenient point, such as at the rear of the body or on the mud guard, but in the present instance, we show the box attached to the left hand rear side of the body 60. By referring to Figs. 1 and 2 of the drawings the location of the box on the vehicle will be readily seen, and the flexible connection or chain 45, that operates the bracket plate 31, is also shown as depending from the box and passing around a guide pulley 61, which in the present instance is attached to the under side of the vehicle body. A wire or other connection 62, is engaged with the chain 45, and extends forward of the vehicle to a lever 63, to which latter it is connected. The lever has its lower end pivotally connected to a bracket 64, that depends from the under side of the floor 65, and the upper end of said lever extends through a slot 66, in the floor. The actuating end of this lever, above the floor, may be formed into a handle or may simply have a plate 67, thereon for operation by the foot. The slot 66, in the floor preferably has an offset whereby to form a shoulder 68, and a flat spring plate 69, is secured in the slot with its free end projecting forwardly beyond the shoulder and also beyond the lever 63, so that when the lever is pushed forward the spring plate 69, will press said lever laterally and cause it to assume a position in front of the shoulder 68, which will retain it against a return movement. A coiled spring 70, serves to constantly draw on the lever 63, and thereby tend to hold it at the rear end 71, of the slot. When lever 63, is pushed forward it will pull on wire 62, and chain 45, and thereby draw bracket plate 31, along guide rod 30, in a direction to open the doors 17 and 18, and on this forward movement spring plate 69 will push lever 63, over in front of shoulder 68, and keep it there thus holding the doors 17 and 18 open and at the same time cause the bell to ring and the light to burn. To close the doors the operator will simply press lever 63, laterally from in front of the shoulder 68, and spring 70, will return the lever, while the coiled springs 42, in the signal box will pull on bracket 31, and thereby operate the links and bars to close the doors and also break the bell and light circuit. By providing the perforations 29, in the partition wall the sound of the bell may freely escape from the interior of the box and the bell may thereby be located in a covered place where it is protected from the weather.

Having described our invention, we claim,—

1. In a signaling device for vehicles the combination with a box, of two doors each having continuous vertical free edges,—said doors being hinged to the box so as to swing their continuous vertical free edges toward and from each other; a translucent sign plate concealed by the doors when the latter are closed; a reciprocating device concealed in the box; lever mechanism also in the box and connecting the reciprocating device with both doors; means entering the box from the exterior and connected with the reciprocating device in the box for operating the latter.

2. In a signaling device for vehicles the combination with a box, of two doors hinged to said box; a translucent sign plate in the box and concealed by the doors when the latter are closed; a reciprocating bracket plate on the interior of the box; lever means also in the box and connecting said bracket plate with the inner side of both doors; spring means also in the box for holding the bracket plate and lever means normally in position to keep the doors closed and means entering the box and connected to the bracket plate therein for moving the bracket plate against the action of said spring means.

3. In a signaling device for vehicles the combination with a box, of two doors hinged to said box; a stationary sign plate in the box; a reciprocating bracket plate in the box; guide means engaging the bracket plate; lever means connecting the bracket plate with both doors; means for normally holding the doors closed and flexible means for moving the bracket plate with respect to said guide means.

4. In a signaling device for vehicles the combination with a box, of two doors hinged to said box; a stationary sign plate in the box; a reciprocating bracket plate in the box; a guide rod engaging the bracket plate and along which said plate may reciprocate; levers connecting the reciprocating bracket plate with both doors; spring means for normally holding the doors closed and flexible means connected to the bracket plate for moving the latter on the rod to open the doors.

In testimony whereof we affix our signatures in presence of two witnesses.

CHARLES C. McCOLGAN.
JOHN MAULSBY SMITH.

Witnesses:
CHARLES B. MANN, Jr.,
BERTHA K. WALTER.